United States Patent [19]
Patrick

[11] 4,432,560
[45] Feb. 21, 1984

[54] SINGLE WHEEL GOLF CADDY

[76] Inventor: James F. Patrick, 106 Imperial Southgate, Lakeland, Fla. 33803

[21] Appl. No.: 305,958

[22] Filed: Sep. 28, 1981

[51] Int. Cl.³ ............................................. B62B 1/26
[52] U.S. Cl. .............................. 280/47.19; 280/47.3; 280/47.33; 280/DIG. 6
[58] Field of Search ............ 280/47.3, DIG. 6, 47.32, 280/47.33, 47.19, 78

[56] References Cited

U.S. PATENT DOCUMENTS

| | | | |
|---|---|---|---|
| 1,960,862 | 5/1934 | Baldwin | 280/DIG. 6 |
| 2,571,392 | 10/1951 | Stringer | 280/DIG. 6 |
| 2,621,799 | 12/1952 | Wilson | 280/DIG. 6 |

FOREIGN PATENT DOCUMENTS 206752  4/1955  Australia ...................... 280/DIG. 6

*Primary Examiner*—David M. Mitchell
*Assistant Examiner*—Joseph McCarthy
*Attorney, Agent, or Firm*—Duckworth, Allen, Dyer & Pettis

[57] ABSTRACT

A single large balloon tire bicycle wheel having a vertical frame attached to the axle extending upward to support handles is provided with a set of horizontal plastic tubes for holding a set of golf clubs. The plastic tubes are mounted in sheet metal brackets on either side of the wheel and have club head holding blocks disposed on the forward ends of the tubes. The tubes are staggered such that each club head is held in place by the holding block on the next lower tube. A tubular strut is attached to the lower end of each tube holder bracket and has a pair of short legs attached thereto. The caddy, when not being moved, rests on one pair of legs leaning slightly to one side. A broad handle may be folded forward when the caddy is at rest, contacting the tire, and usable as a seat.

9 Claims, 4 Drawing Figures

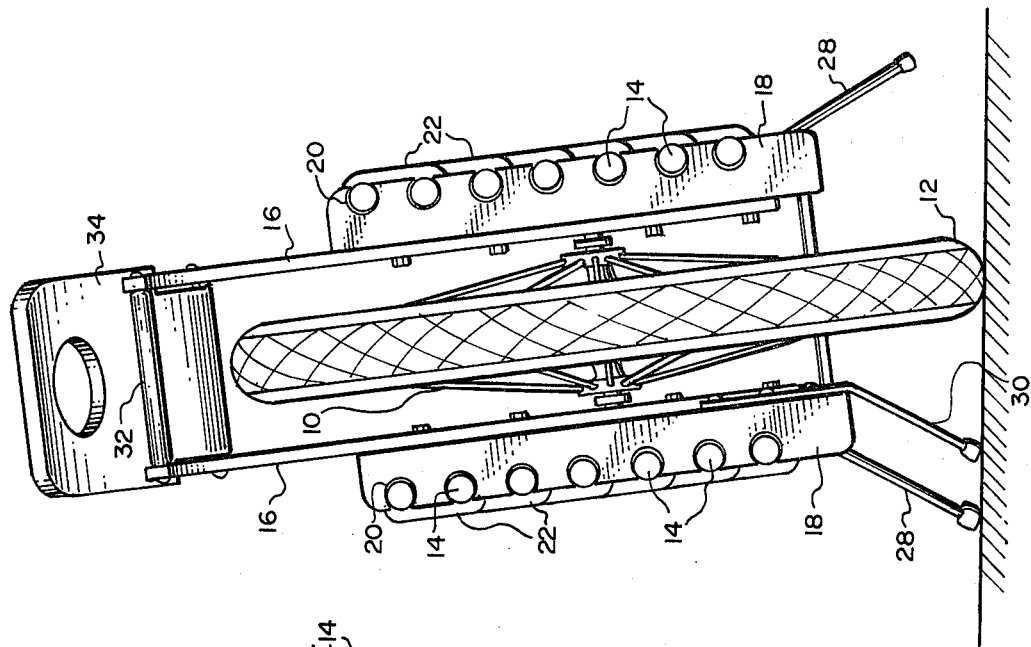
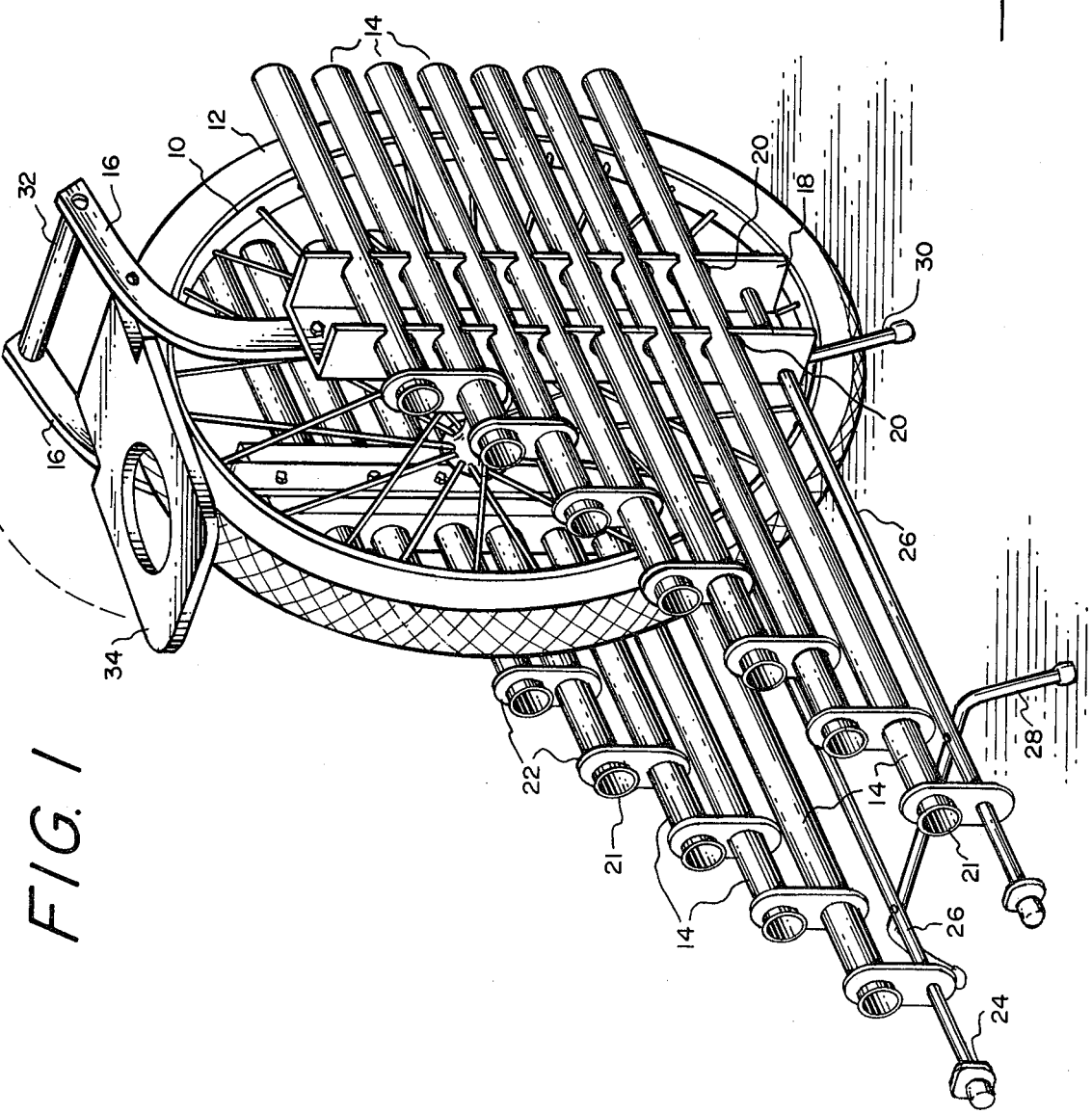

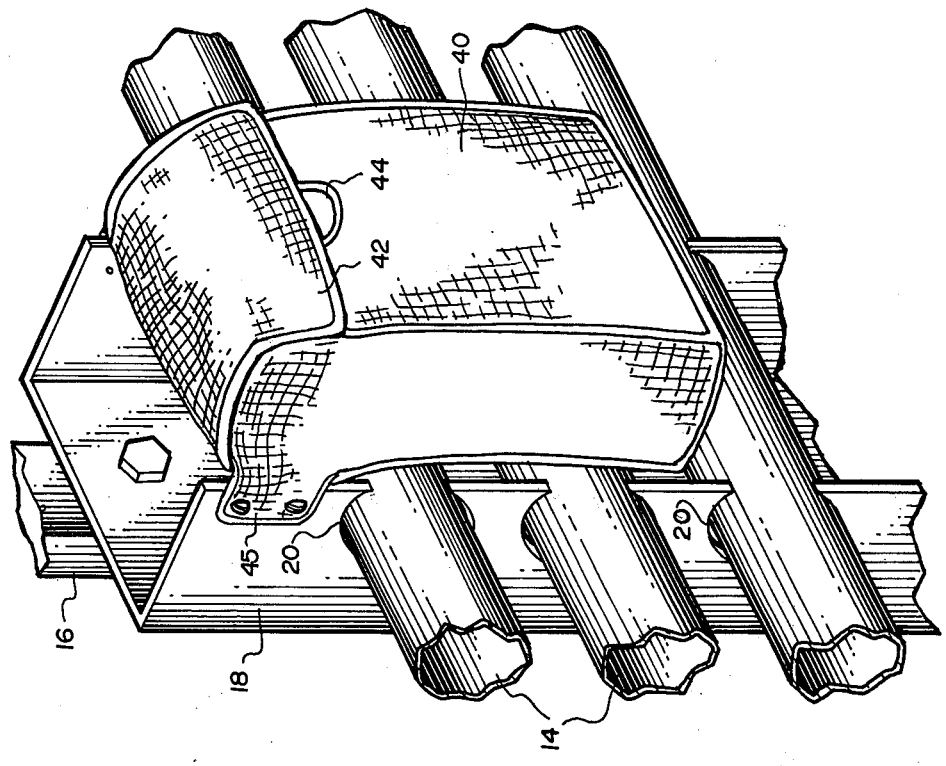
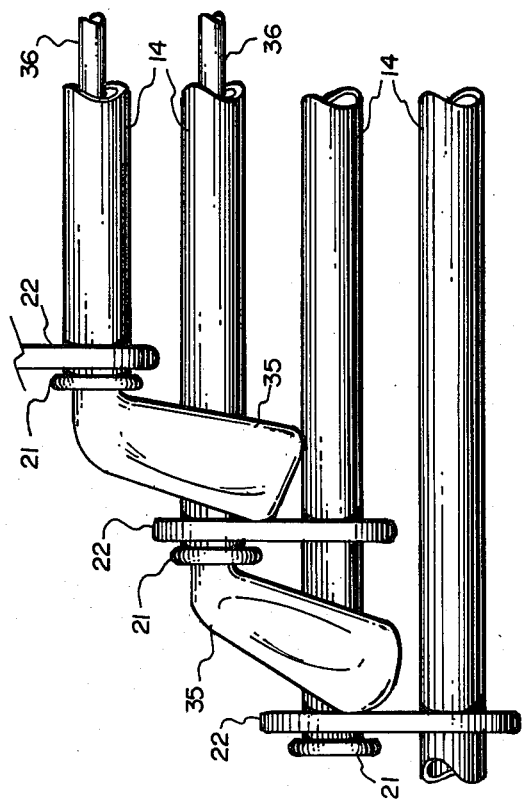

SINGLE WHEEL GOLF CADDY

BACKGROUND OF THE INVENTION

1. Field of the Invention

The present invention relates to a golf caddy, and more particularly to a golf caddy having a single large wheel, horizontal tubular golf club holders, and a combination handle and seat.

2. Description of the Prior Art

At present, high labor costs essentially eliminate the use of caddies to carry a golfer's bag and clubs. Therefore, many golfers rent motorized golf carts which greatly increase the cost of playing and can cause damage to the golf course. There is a need for a means for a golfer, and particular older golfers, to transport the clubs around a golf course without undue exertion and which includes a seat upon which the golfer can rest while waiting for others to complete a play. Although this problem has been addressed in the prior art, known golf caddys are not totally suitable.

For example, a very early U.S. Pat. No. 1,176,031 to Cady shows a cylindrical and removable golf bag in a cradle having a pair of small wheels disposed at the lower end and a brace to permit holding the cylindrical carrier at about a 60° angle when it rests. The use of small wheels, as is common with a number of other prior art caddies, makes the unit difficult to roll, especially in the rough and when the grass is wet. The use of a cylindrical holder provides no means to maintain the clubs separate and therefore clubs need to be protected by covers which adds to the inconvenience when selecting different clubs. A patent to Moreland, U.S. Pat. No. 2,359,870 discloses a combination stool and carrier which must be collapsed for transport and opened when it is at rest. This unit also uses small wheels and a cylindrical holder for the clubs. Patents to Cotton, U.S. Pat. No. 3,165,330 and Upham, U.S. Pat. No. 3,164,393 both approach the problem of separating the clubs on a wheeled cart or caddy by the use of vertical tubes into which the club handles are inserted. Each of these also disclose a pair of small wheels. The disadvantage of the vertical tubes is that one must pull the club upward to remove which is somewhat inconvenient. A collar for golf bags is disclosed by Wilson, U.S. Pat. No. 2,621,799 which has a pair of wide spaced small wheels and brackets having clips in which the handles of the golf clubs are inserted to hold the clubs in a horizontal position. The collar is made to accept a standard golf bag which is used for permanent storage of the clubs. While a step forward in that the horizontally disposed clubs are much easier to extract, the small wheels increase exertion during transport. A collapsable golf cart is taught by Dawson, U.S. Pat. NO. 3,266,814, which has a rectangular framework having a top surface utilized as a seat and a pair of small widely spaced wheels at the bottom thereof. A set of holders having a plurality of apertures is provided with a club inserted in each aperture and held at about a 30° angle. The Dawson unit is bulky and by virtue of the small wheels would be difficult to push. U.S. Pat. No. 3,083,029 to Russell shows an improvement by the use of a pair of wheels, somewhat larger than other caddies, which permit a much easier transport. However, this golf caddy utilizes two wheels with a cradle between into which a standard golf bag or cylindrical club holder must be clamped. None of these prior art units have the desired characteristics believed ideal for the purpose.

SUMMARY OF THE INVENTION

My invention utilizes a single large balloon tire, spoked, bicycle wheel having a simple vertical frame attached to the axle of the wheel extending upward to support a pair of handles, one of which is also usable as a seat. A set of horizontal plastic tubes supported by a sheet metal bracket is attached to the vertical frame on each side of the wheel. Plastic or rubber club head holding blocks are disposed on the forward ends of each tube and the tubes are staggered such that each club head is firmly held in place in its tube by the club head stop blocks.

A tubular strut is attached to the lower end of each tube holder bracket projecting forward slightly beyond the lower tube. A pair of short legs are attached to the forward ends of the struts. A single leg is attached to the lower end of one of the tube holder brackets such that, at rest, the single wheel is leaning slightly to the side having the single leg. The caddy is thus stable when not in use.

The upper end of the vertical frame is bent rearwardly and has a cylindrical crosspiece at the upper end. This crosspiece may be gripped when moving the caddy. Directly below the crosspiece is a forward projecting, essentially rectangular combination handle and seat pivoted to the frame at its back end. A large opening is cut into the forward end of the handle-seat. When the caddy is to be transported over the golf course, the handle-seat is gripped through the opening at the forward end and swung backwards over the crosspiece. By pushing down slightly on the handle-seat, the caddy will tip backward with respect to the wheel axle and can be easily pushed. By virtue of the very large wheel which may be 26 inches in diameter and the use of a pneumatic balloon tire, very little effort is required to push the caddy of the invention even over rough terrain, through the rough or through wet grass. When the golfer reaches his destination, the caddy is leaned slightly to one side to rest on the short legs. The head of the club desired is pulled outward, disengaging the head from the club head block and is then very easily drawn out horizontally from its tube. As may also be recognized, all of the clubs are held completely separate from each other preventing any possible damage to the clubs and permitting very quick selection of a desired club. Any time the golfer is waiting, such as for another player to complete a shot, the handle seat is folded forward and permitted to rest on the top of the tire. The golfer may now rest on the handle-seat.

It is therefore a principal object of my invention to provide a portable golf caddy which is very easy to push when transporting clubs and which provides a seat for resting when the unit is stationary.

It is another object of my invention to provide a transportable wheeled golf caddy in which clubs are individually carried in plastic tubes and in a horizontal orientation to make selection of the clubs and removal from the holders very quick and easy.

It is still another object of my invention to provide a caddy having separate tubular club holders in which the club heads are positively restrained during transport to prevent accidental dislodgment and movement of the clubs.

It is yet another object of my invention to provide a transportable golf caddy having a single large bicycle type wheel to minimize the weight of the caddy and to contribute to the ease of transporting the unit.

These and other objects and advantages of my invention will become apparent from the following detailed description and the drawings.

BRIEF DESCRIPTION OF THE DRAWINGS

FIG. 1 is a perspective view of my single wheeled golf caddy shown at rest with the handle-seat in position for resting;

FIG. 2 shows a rear view of my invention with the handle-seat in a position for transport and showing the support legs;

FIG. 3 is a partial view of the staggered carrier tubes serving as club holders showing the club stops and the manner of holding a club temporarily into place; and FIG. 4 shows a partial perspective view of the carrier tube bracket having an optional pocket assembly attached for carrying golf balls, tees, and the like.

DETAILED DESCRIPTION OF THE PREFERRED EMBODIMENT

Referring to FIG. 1, a perspective view of the single wheel golf caddy is shown in an at-rest position. A bicycle wheel 10 is utilized having a balloon tire 12. Although other sizes may be used, I have found that a 24" or 26" bicycle wheel is eminently suited for this purpose. A generally U-shaped framework formed by bars 16 and crossbar 32 is attached to either side of the axle bolt of wheel 10. Although bars 16 may be formed from any suitable material, I prefer to use 0.064 inch wall, square aluminum tubing, 1"×1" to minimize the weight of my golf club caddy. A metal bracket 18, bent to form a channel, is mounted on either side of wheel 10 and bolted to bars 16. Brackets 18 are preferably formed from 0.036 inch sheet steel. A plurality of circular openings are cut into the outer edges of the channel sides of bracket 18 as seen in FIG. 1 to accept a plurality of club holding tubes 14 which may be of plastic. Each tube has a rim 21 at its forward end. The tubes are graduated in length such that the rear ends are aligned and the front ends are staggered.

A plurality of club head holding blocks 22, which may be formed from a thin, resilient material, are disposed at the rim 21 of each tube engaging the tube directly below rim 21. As best seen in FIG. 3, tubes 14 serve to accept the handles and shafts 36 of a set of golf clubs. When a club is inserted in a tube 14, the head portion 35 is rotated toward the next lower tube allowing the face of the club to rest on that tube and against club head holding block 22 to prevent the club from sliding forward in its holding tube 14. The caddy is, of course, tipped backward during movement and gravity prevents a club from becoming accidentally dislodged from the carrier during transport. When a golfer selects the club, he easily flips the head outward slightly, disengaging the club head holding block 22 and the club is then easily withdrawn from its holding tube 14.

On each side of my golf club caddy, I fasten a forwardly extending lower support strut tube 26 in bracket 18 which projects slightly ahead of lower club holding tube 14. A rubber crutch tip is forced on the outer end over a small club head holding block 24 which holds the club in the lower tube 14. A lateral strut 28 having a pair of outwardly canted legs is attached to the lower support tubes 26 as indicated in FIG. 1. A single short canted leg 30 is attached to one of the tube brackets 18. These legs 28 and 30 act as a stand for the caddy when at rest. As best seen in FIG. 2, the length of legs 28 and 30 are such that wheel 10 leans slightly to the left side. Although I have shown leg 30 on the left side which is most convenient for a right handed person, this leg could be installed on the right side for a left handed golfer.

A wooden handle-seat 34 is installed below crossbar 32 between bars 16 so as to pivot at its rearward end. When the caddy is at rest, as indicated in FIG. 1, the handle-seat 34 may be folded forward to rest on tire 12. This provides a convenient seat to permit a golfer to rest briefly while waiting a turn. Handle-seat 34 also serves in this position to provide a braking action on tire 12 when the seat is in use. When the golfer desires to transport his clubs, he swings handle-seat 34 rearward as indicated by arrow A until it rests on crossbar 32, as also seen in FIG. 2. He may then grasp handle-seat 34 through the opening therein and utilize the same to push the caddy along. The entire framework formed by bars 16 and crossbar 32 may be rotated rearwardly about the wheel axle to balance the caddy and the wheel is maintained in a vertical position during transport. Due to the staggered tubes 14 and the symmetrical construction of the caddy, it is very easily balanced and requires a minimum amount of force to move.

The caddy as shown in FIG. 1 will hold 14 clubs with each club maintained separate from all the others which eliminates the necessity for head covers and which also permits the golfer to quickly locate the desired club.

Turning now to FIG. 4, a useful accessory for my golf club caddy is shown. A small bag 40 may be attached to the upper end of bracket 18 by tabs 45 or similar attachment. Bag 40 is useful for storing and carrying golf balls, tees, a towel, and the like and may, of course, be made in any desired size. Bag 40 may be constructed of any convenient material such as leather, canvas, plastic, or similar material. Preferably, cover 42 having tab 44 is maintained closed by Velcro$^R$ fastener material.

As may now be recognized, I have disclosed a relatively simple, lightweight, and convenient golf club caddy having a single large diameter bicycle wheel with club holding racks disposed on each side in a symmetrical fashion. The lightweight, the balance due to the symmetry of the structure, and the large diameter balloon tire bicycle wheel permit a golfer to carry his clubs and accessories around the course with a minimum of physical exertion even over the rough, sandy areas, and other terrain which make the usual small wheel caddies difficult to handle.

Although a particular implementation has been shown for exemplary purposes, it will be obvious to those of skill in the art that the invention may be modified for different size wheels, different materials, and other such changes which fall within the spirit and scope of my invention.

I claim:
1. A golf club caddy comprising:
   a bicycle wheel having a pneumatic tire mounted thereon, and an axle;
   a generally U-shaped framework disposed over said wheel and tire and bolted to said axle on each side thereof;
   a plurality of golf club holding tubes disposed essentially horizontally in a first bracket attached to a side of a first leg of said frame on one side of said wheel and tire, and in a second bracket attached to a side of a second leg of said frame on the other side of said wheel;

golf club head holding means disposed at the forward ends of said tubes, said tubes having said forward edges staggered to provide separation of the golf club heads;

caddy stand means for supporting said caddy at rest; and handle-seat means pivoted within an upper portion of said frame, said handle-seat means pivoted forward to rest upon said tire when said caddy is at rest forming a seat and pivoted rearward to serve as a handle when transporting said caddy.

2. The caddy as defined in claim 1 in which said golf club head holding means are blocks disposed below each of said golf club holding tubes, said blocks constrained at each end thereof in a position that the head of a golf club held in one of said holding tubes contacts a face of the one of said blocks immediately below said one of said tubes for holding the club against the opening of said one of said tubes when caddy is in transport.

3. The caddy as defined in claim 2 in which:

each of said golf club holding tubes includes a rim around its forward end; and each of said blocks is essentially rectangular in shape having an opening therethrough near each end thereof, said block installed by inserting a first one of said tubes through one of said openings such that said block bears against said rim, and by inserting a second one of said tubes immediately below said first one through the other of said openings.

4. The caddy as defined in claim 1 in which said tire is a balloon type tire.

5. The caddy as defined in claim 1 in which said wheel is spoked.

6. A lightweight wheeled golf club caddy easily pushed across rough terrain comprising:

a pair of club holding means for holding each of a plurality of golf clubs essentially horizontally and separate from each other golf club;

a bicycle-type wheel disposed between said pair of club holding means and attached thereto by the axle of said wheel;

an upward projecting handle framework attached to each of said pair of club holding means and said axle;

a combination handle and seat attached to said handle framework and adapted to fold forward against the periphery of said wheel when said caddy is at rest to thereby form a seat, and to fold rearward to serve as a handle when said caddy is being moved; and stand means for supporting said caddy at rest.

7. The caddy as defined in claim 6 in which said stand means includes an essentially horizontal support tube immediately below one of said pair of club holding means, said support tube having short, downwardly extending legs for contacting the ground.

8. The caddy as defined in claim 7 in which said club holding means comprises:

a plurality of tubes for accepting the handles and shafts of golf clubs to be held, each of said tubes having a radially projecting rim at its forward end, said tubes disposed essentially horizontal when said caddy is at rest with said tubes arrayed one above the other with the lowermost tube projecting a maximum distance forward and the forward ends of the other tubes staggered with the forward end of the uppermost tube projecting a minimum distance forward; and a plurality of elongate blocks having an opening at each end thereof, said opening slightly smaller than the outside size of said tubes, one of said blocks disposed on each of said tubes with one of said openings abutting said rim, the other of said openings disposed over the next lower tube whereby the head of a club inserted into one of said tubes is held in place by the one of said blocks below said one of said tubes.

9. The caddy as defined in claim 8 which further comprises a pocket attached to said bracket for holding golfing accessories or the like.

* * * * *